June 11, 1940.  W. E. MacCREEDY  2,204,253
LIQUID LEVEL GAUGE
Filed Dec. 13, 1935  4 Sheets-Sheet 2

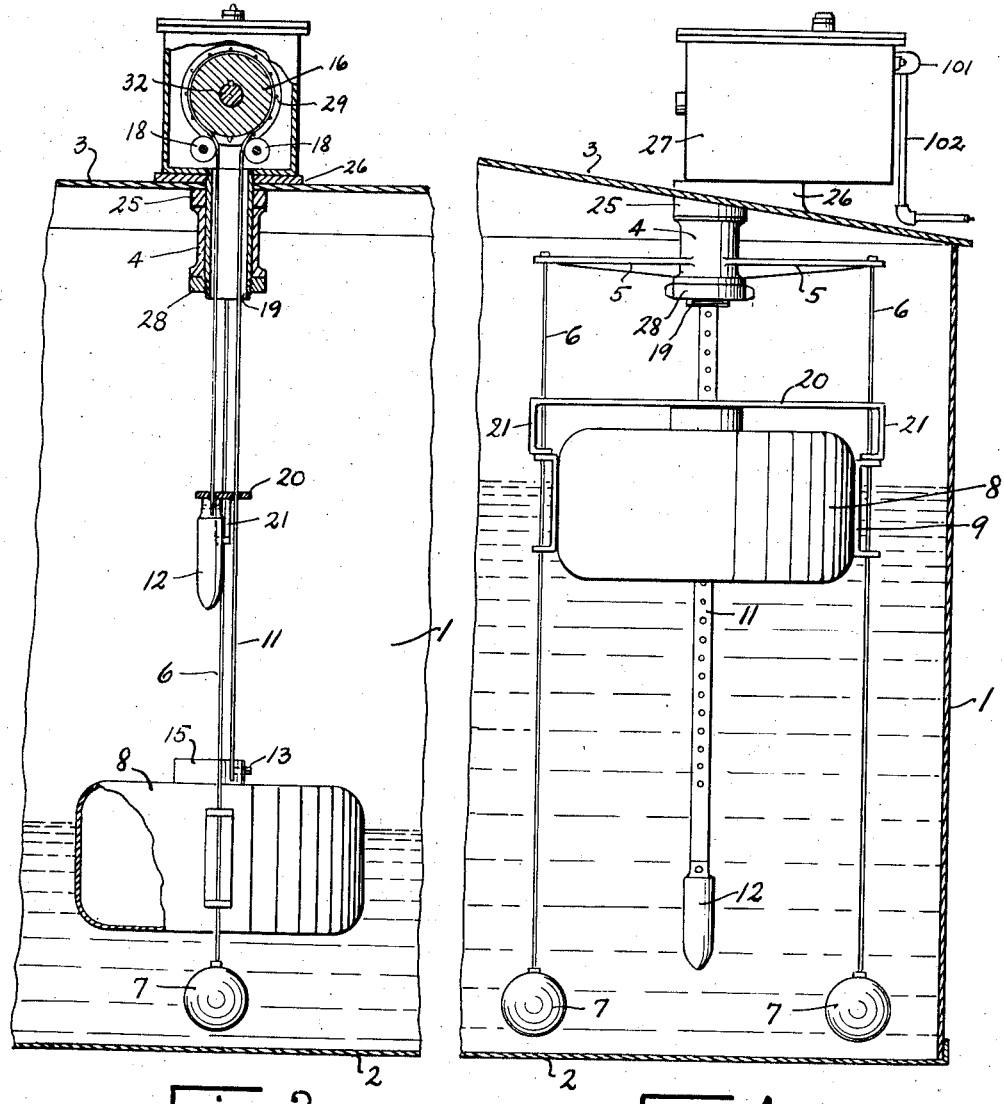

Inventor
William E. MacCreedy.

By J. Vincent Martin
and
Ralph R. Browning
Attorneys

June 11, 1940.  W. E. MacCREEDY  2,204,253
LIQUID LEVEL GAUGE
Filed Dec. 13, 1935  4 Sheets-Sheet 3

Inventor
William E. Mac. Creedy.
By J. Vincent Martin
and
Ralph R. Browning
Attorneys Patented June 11, 1940

2,204,253

UNITED STATES PATENT OFFICE 2,204,253

LIQUID LEVEL GAUGE

William E. MacCreedy, Houston, Tex.

Application December 13, 1935, Serial No. 54,229

3 Claims. (Cl. 201—55)

This invention relates to liquid level gauges, and particularly to gauges adapted to be used for measuring the level of oil in oil storage tanks, or the like, and for indicating such measurement at some predetermined central point remote from the tanks.

Heretofore it has been customary in measuring the level of oil in oil tanks to lower a sounding device through an opening in the tank roof to the bottom of the tank, and to determine by such means the position of the liquid level with respect to the bottom of the tank. This method has, however, proven to be inadequate for a number of reasons. It is inaccurate because the sounding devices tend to rest on the thick deposit which forms on the bottoms of such tanks, and because of this fact a lower level is indicated than actually exists. In the second place, it is dangerous from the standpoint of the man taking the readings, because of the toxic nature of the gases which are sometimes given off by various oils. Also, it is not an unknown occurrence for static electricity to build up on the sounding equipment as it is being raised or lowered, and to cause a spark which ignites the explosive gases given off by the oil. Furthermore, such a system does not give remote readings, but necessitates a man going to each tank to take the reading therefrom. The readings cannot be very closely timed because of the time required for the man to make his rounds to the various tanks, and it is highly desirable that the readings of all the tanks in a given group be taken as nearly the same time as possible.

Various means have been devised for indicating the levels of liquid in a number of tanks, and for indicating such levels at a remote point or central station. However, these have for the most part proven unsatisfactory for mechanical and electrical reasons, the devices being such as to be unreliable in their results under certain circumstances, and it has been necessary in conjunction with such devices to continue the practice of reading liquid levels by sounding as above referred to.

It is an object of this invention to provide an indicating means for indicating the liquid level in one or more tanks or containers at a central station remote from the tanks, which device shall always give accurate and reliable readings, and shall be as nearly as possible free from wear and deterioration.

It is a further object that this device shall be adjustable to give an exact reading indicating the level of oil in a tank at all times, regardless of whether the oil may be covered with froth or whether a heavy thick deposit may be formed on the bottom of the tank.

It is a further object to provide a means whereby the readings of the device may be checked accurately at the exact time the readings are taken, a part of the device being used in such checking operation.

It is a further object to provide a counterbalanced float for operating such an indicating means, and to provide a novel and advantageous arrangement for such float and its counterweight.

It is a further object to provide a novel rheostat construction specially adapted for use in connection with the level indicating device of this invention.

With the above and other objects in view, this invention contemplates the various parts and combinations set forth in the following description and the accompanying drawings, it being understood, however, that the same are by way of illustration and example only, and are not to be taken by way of limitation. The scope of this invention is to be limited only by the prior art and by the terms of the appended claims.

Referring now more particularly to the drawings in which like numerals indicate corresponding parts throughout:

Fig. 1 is a partial sectional view through an oil tank showing that portion of the device which is located on and in the oil tank.

Fig. 2 is a partial sectional view taken at right angles to Fig. 1, and showing portions of the liquid level indicating device in section.

Fig. 3 is a top plan view of the float shown in Figs. 1 and 2.

Fig. 4 is a top plan view of the spacing and guiding bar for the float and its counterweight.

Figure 5:
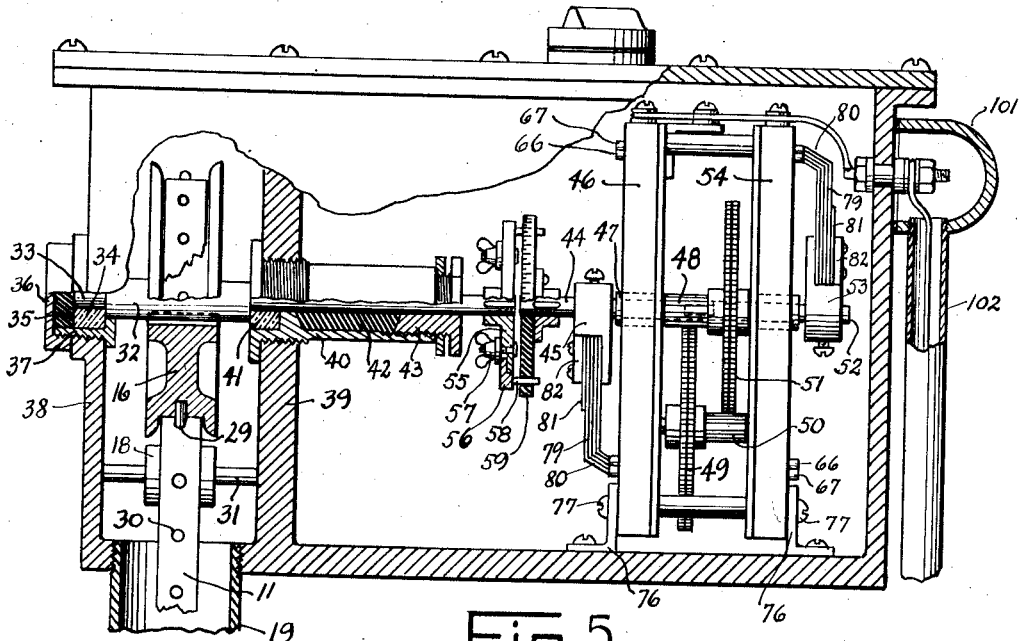
Fig. 5 is an enlarged view partly in section showing the mechanism located on top of the tank by which the liquid level in the tank is translated into terms of electrical resistance.

In general, this invention as illustrated consists of a float and associated mechanism located within each tank the level of which is to be measured, and connected through an opening in the top of the tank with means for varying the resistance of a plurality of rheostats, or other variable electrical resistance units. The resistance of these rheostats, which is controlled by the level of the liquid in the tank, is then measured by a measuring device located at some predetermined remote point used as a central station.

Referring first to the float and its associated mechanism, there is illustrated in Fig. 1 a portion of a conventional tank having side wall 1, a bottom 2, and a top or roof 3. Secured to the underside of the roof 3 is a bracket 4 having laterally extending arms 5 from which are suspended by means of wires 6 or the like a pair of weights 7. These wires 6 thus held in position by the weights 7 serve as guides for the float 8, the brackets 9 secured to the float 8 being provided with openings 10 for the purpose of receiving the wires. Connected to the float 8 is a metallic tape 11 or the like, the opposite end of which carries a counterweight 12 adapted to maintain the tape 11 taut at all times. The tape 11 is secured to the float 8 by means of a set screw 13 which clamps the end of the tape within a slot 14 formed in the circular bracket or bushing 15. The tape passes over a pulley 16 located above the tank roof and is adapted when the float is in its upper position to pass down through the opening 17 in the float and suspend the counterweight 12 below the float as shown in Fig. 1. A pair of idler pulleys 18 are utilized just below the pulley 16 for the purpose of holding the tape in contact with the pulley 16 throughout most of its periphery, and for permitting both ends of the tape to pass downwardly into the tank through a single relatively small opening in the short length of pipe 19.

For the purpose of guiding the counterweight 12 both when it moves upwardly and when it moves downwardly in such a manner that it will pass without interference through the opening 17, there is provided a spacing and guiding bar 20 having downwardly turned portions 21 at its ends formed with openings 22 adapted to slidingly engage the guide wires 6 above the float and above the counterweight. Openings 23 and 24 are provided centrally of the bar 20 for the purpose of slidingly receiving those portions of the tape 11 to which the counterweight 12 and the float 8, respectively, are attached.

The bracket 4 is spaced from the slanting roof 3 of the tank by means of a wedge shaped washer 25 which serves to properly position the bracket 4 with respect to the roof. A second washer or support member 26 of similar wedge shaped formation is positioned on top of the roof 3 and forms a support for the housing 27 in which the pulley 16 and other mechanism is contained. The nipple 19 is threadedly engaged in an opening in the lower wall of the housing 27, and is secured firmly in position by means of a wing nut 28 threaded onto its lower end below the bracket 4. It will be seen that this construction positively secures the bracket 4, the washers 25 and 26, and the housing 27 in proper position.

The pulley 16 is provided with radially projecting pins 29 at regularly spaced intervals, said pins being adapted to receive and positively engage the openings 30 in the tape 11 so as to prevent slippage between the tape and the pulley. The idle pulleys are mounted on suitable shafts 31 and the drive pulley 16 is mounted on a shaft 32. The shaft 32 is provided with a reduced end portion 33 journaled in a bearing 34, and a packing 35 is placed on the end of the shaft and bearing. The packing is held in place by a threaded cap 36 which fits over the end of the bushing 37, the bushing 37 being in turn threaded into the wall 38 of the housing and serving as a support for the bearing 34 and the packing 35. On the opposite side of the pulley 16 the housing is provided with a partition 39 threaded to receive a second bushing 40 which supports a second bearing 41. The bushing 40 also provides a stuffing box for receiving a packing 42 which is in turn held in position by means of the gland 43. A lock nut for this gland may be provided as shown.

Inwardly of the gland 43 the shaft 32 terminates and is coupled to a second shaft 44 which carries a brush 45 forming a part of a rheostat. A suitable bearing 47 is provided for the passage of this shaft through the rheostat, and on its inner end a pinion 48 is keyed thereto. Cooperating with the pinion 48 is an idler gear 49 integrally connected with an idler pinion 50 which in turn meshes with the gear 51. The gear 51 is mounted on a third shaft 52 carrying a brush structure 53 for a second rheostat 54. The brush 45 of the rheostat 46 is thus positively geared in a fixed ratio to the brush 53 of the rheostat 54, and the movement of one will always be directly proportional to the movement of the other.

For the purpose of coupling the shafts 32 and 44 together, a disc 55 is keyed to the end of the shaft 32 and carries a ring 56 on its outer periphery capable of relative circumferential adjustment. The ring 56 is held in position on the disc 55 by means of wing nuts 57 mounted on bolts in the disc 55. These wing nuts will serve to hold the ring 56 in any desired adjustment. The ring 56 carries one or more axially extending pins 58 or the like adapted to engage openings in the insulating disc 59, the latter being in turn fixedly mounted on the end of the shaft 44. The outer edge of the disc 59 is graduated to indicate the position of the brushes and to facilitate adjustment. It will be seen that the coupling thus provided is a flexible, adjustable insulating coupling, yet that it positively connects the two shafts for rotation together.

Figure 8:
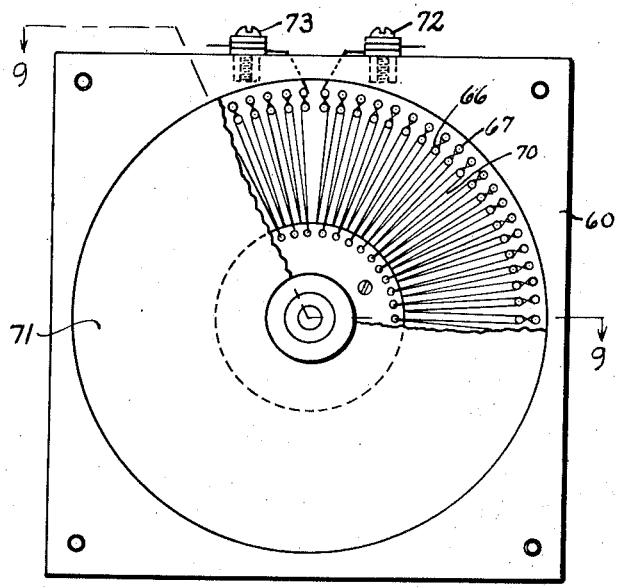
Fig. 8 is a rear elevation of the same with the cover removed and a portion of the insulating material omitted so as to illustrate the method of winding.
Figure 11:
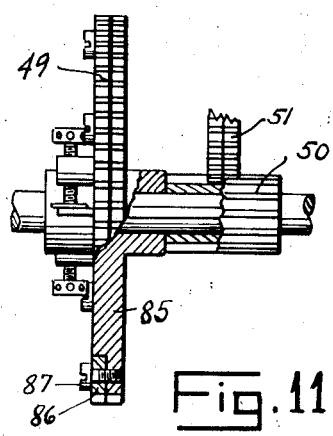
Fig. 11 is a view partly in vertical section illustrating the details of the gearing for connecting the two rheostats.
Figure 10:
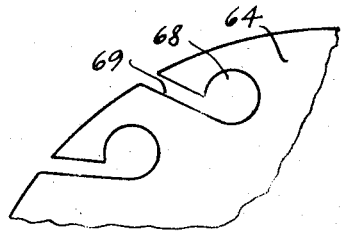
Fig. 10 is a fractional elevation showing a detail of one of the anchor plates for the rheostat winding.
Figure 9:
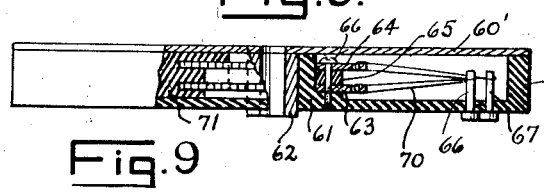
Fig. 9 is a view partly in horizontal section of the same rheostat.

The two rheostats illustrated at 46 and 54 are preferably identical in construction, and each consists of a hollowed out insulating member 60 having a hub 61 receiving a bushing 62 which serves as a bearing for the shaft passing therethrough. The hub 61 is adapted to receive a pair of anchor plates 63 and 64 spaced apart by spacer ring 65 and secured in place by a bolt 66 or the like. A cover 60' which carries the bushing 62 is provided for the hollowed out portion of the member 60. Arranged in concentric circular rows adjacent the outer periphery of the hollowed out portion and extending through the wall of the member 60 are a plurality of anchor posts 66 and 67 which are mounted in pairs and are provided on their outer ends with heads serving as contact posts for the respective brushes. Each of the anchor plates as shown in Fig. 10 is provided with a series of openings 68 about its periphery, each opening being provided with a slot 69 to enable it to be easily threaded with the resistance wire 70. The resistance wire is wound in figure-8 fashion about a pair of the anchor posts, is then passed through one of the openings 68 in one of the anchor plates 64, is passed back and wound figure-8 fashion around the next pair of anchor posts, then through an opening 68 in the other anchor plate 63, and so on. If it should so happen that the resistance wire should be stretched or otherwise changed in its resistance between two successive pairs of anchor posts, the resistance of each loop may be varied to compensate therefor by the application of a greater or less amount of solder to and between the anchor posts. By this means, each loop of the resistance wire between adjacent pairs of anchor posts may be regulated to exactly the same resistance within an extremely small degree. After the resistance wire has been wound, the hollowed out portion of the member 60 may then be filled in with a suitable insulating material, such as liquid synthetic resin, and the same then polymerized to form a permanent cover and seal the resistance. Binding posts 72 and 73 are mounted on each rheostat and connected to the respective ends of the resistance wires.

The parts of each rheostat are secured together by means of screws 74 or the like placed at their corners, and the two rheostats are rigidly fixed with respect to each other by means of the spacer posts 75. Adjustable feet or brackets 76 held in place by the screws 77 are provided for the support of the rheostats.

Figure 7:
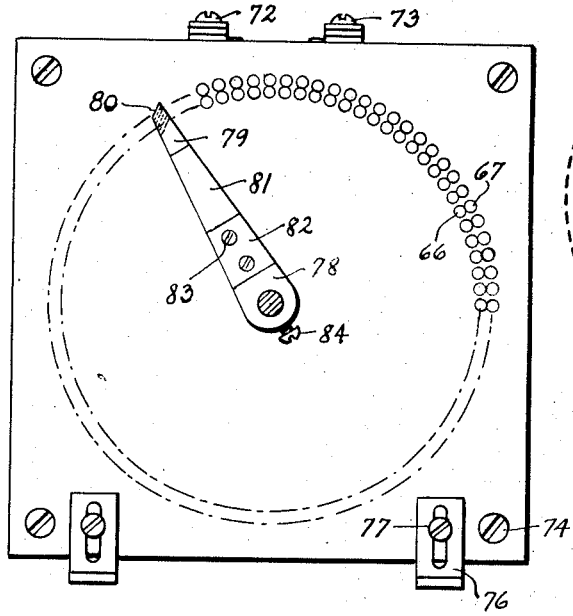
Fig. 7 is a front elevation of one of the rheostats shown in Figs. 5 and 6.
Figure 12:
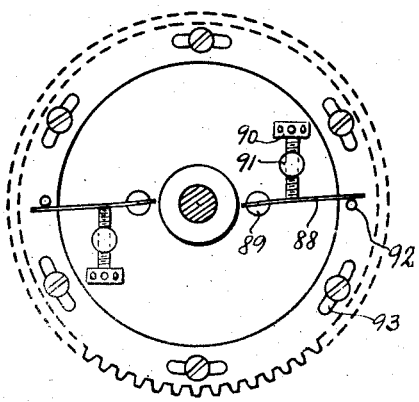
Fig. 12 is a front elevation of one of the gears shown in Fig. 11.

The brushes 45 and 53 of the respective rhesotats are each formed of a laminated construction as illustrated at 79, the same being mounted in castings 78 which engage the respective shafts. These laminations are bent to an angular position as shown at 80 so as to contact with the outer ends of the anchor posts 66 and 67. It will be noted in Fig. 7 that these ends are disposed at an angle with respect to their direction of movement so that in moving across the ends of the anchor posts they will tend to sweep from their path any oxidation or other matter which may have accumulated on the anchor posts and which might tend to prevent a good contact. The laminated brushes may be strengthened or caused to bear more firmly against the anchor posts by means of reinforcing spring leaves 81 if so desired. The brushes are held in position by clamping plates 82 secured by screws 83 to the members 78. The members 78 are clamped to their respective shafts in proper position by means of set screws 84.

The gears 49 and 51 are specially constructed to eliminate backlash so that the same relation between the brushes 45 and 53 will prevail at all times regardless of their direction of movement. In these gears, each gear is formed with a main portion 85 which is fixedly secured to the shaft on which the gear is mounted, and this main portion is recessed adjacent its outer periphery to provide space for a ring 86 which carries approximately half of each gear tooth. The ring 86 is held in position by screws 87, and is urged in a circumferential direction by means of a spring 88 or the like mounted on the main portion by suitable anchorage 89. This spring 88 is tensioned by means such as the set screw 90 passing through a threaded stud 91 and bearing against the spring. The ring 86 is provided with a laterally projecting pin 92 against which the end of the spring 88 bears. Slots 93 permit the passage of the screws 87 without preventing the ring 86 from moving circumferentially. It will thus be seen that each of the teeth of each pinion gear will be resiliently held between the two portions of each tooth or its corresponding gear 49 or 51, and that because of this there will be no backlash permitted between the two gears.

Figure 6:
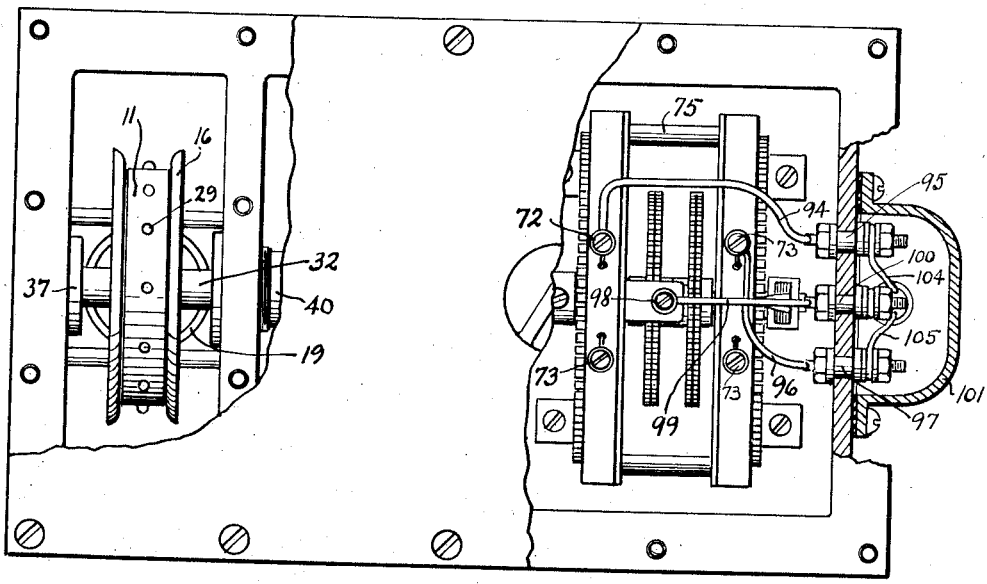
Fig. 6 is a top plan view of the same showing portions of the cover broken away and parts of the device in horizontal cross section.

Referring to Fig. 6, one of the terminals 72 of the rheostat 46 is connected by means of a conductor 94 to a binding post 95 which passes through the wall of the rheostat housing. A second conductor 96 is connected to the terminal 73 of the other rheostat 54 and to a second binding post 97 which likewise passes through the housing wall. A binding post 98 which is electrically connected to the shafts 44 and 52, and hence to the brushes 45 and 53, is connected by means of a conductor 99 to a third binding post 100 passing through the housing wall. These three binding posts are housed within a box 101 communicating with a conduit 102, and the various connections leading to the central station are secured thereto as will now be described.

Figure 13:
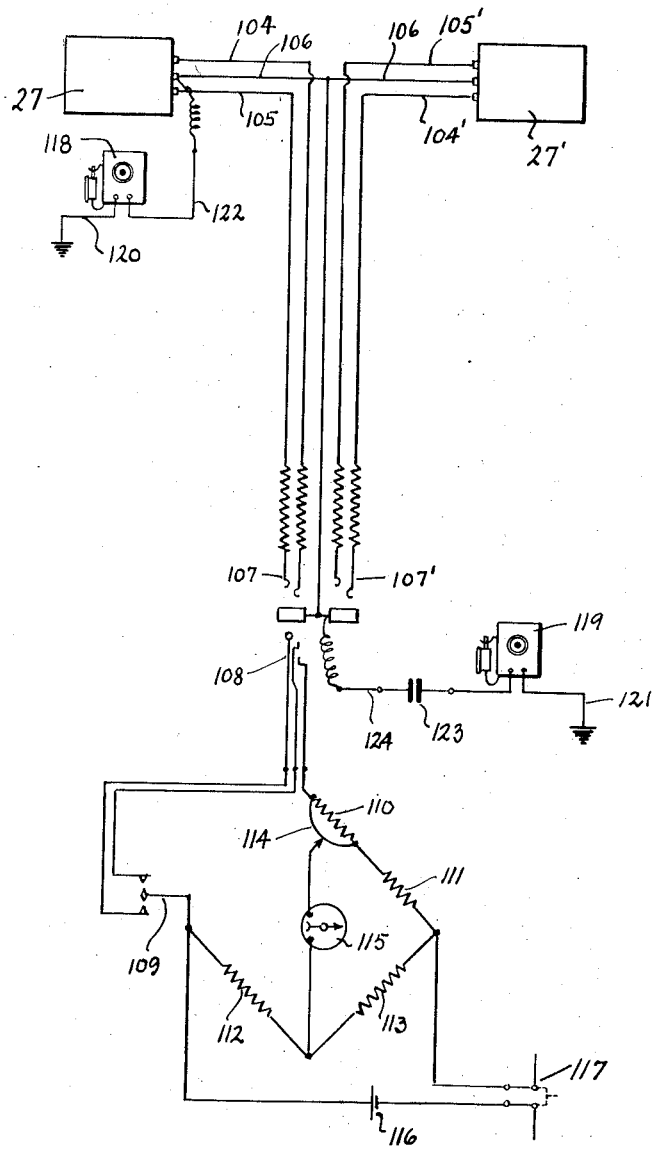
Fig. 13 is a diagrammatic illustration of the electrical hook-up employed in this embodiment of the invention.

Referring now to Fig. 13, there are connected to each of the rheostat units leads 104 and 105, respectively, secured to binding posts 95 and 97. A third lead 106 is common to all of the rheostat units, regardless of the number of units which may be employed in the system. In Fig. 13, the leads connected to the unit 27' are indicated as 104' and 105'. At the central station the leads 104 and 105, together with the connection from the common conductor 106 are connected to a three-point jack 107 adapted to receive a standard three-contact plug 108. A second jack 107' is provided for the unit 27', and it will be understood that any number of such jacks may be provided, depending upon the number of units employed and the number of tanks which are to be gauged. The leads from the plug 108 which correspond to the conductors 104 and 105 are selectively connected by a double throw switch 109 to one side of a modified Wheatstone bridge. The lead corresponding to the common conductor 106 will be connected to the other side of such bridge. This bridge consists of fixed resistances 110 and 111 in series with each other, and of fixed resistances 112 and 113 likewise in series with each other. In parallel with fixed resistance 110 is a variable calibrated resistance 114, and connected to the variable point of this resistance and between the two resistances 112 and 113 is a galvanometer 115 or the like. A battery 116 is connected across the resistances 112 and 113, and with the switch 117 for controlling the same completes the Wheatstone bridge. The operation of the Wheatstone bridge will be obvious to one skilled in the electrical art.

The setting of the variable resistance 114 will determine the resistance of the rheostat located in the unit to which the bridge is connected, and will hence be a measure of the level of the liquid in the corresponding tank, so that the variable resistance 14 will be graduated in terms of tank capacity, and its setting when the bridge is balanced will serve to indicate the level of the liquid in the tank.

For the purpose of checking, adjusting and calibrating those portions of the apparatus at the central station and on the tank, portable telephone sets 118 and 119, or other electrical signalling apparatus, may be provided. Each such set is preferably grounded as at 120 and 121, and one of them is connected at 122 to the common return lead 106 of the indicating system. It will be noted that this return lead is ungrounded so that it may be used for this purpose.

The other set 119 is connected through a condenser 123 and a lead 124 to the common return 106, the purpose of the condenser being to prevent any possible interference by the signalling apparatus with the action of the indicating system.

In operation, the float 8 will, of course, rise and fall with the liquid level, the bar 20 being carried upwardly by either the float 8 or the counterweight 12, depending upon which is higher. The bar 20 will thus at all times be in position to guide the float 8 and the counterweight 12 relative to each other, so that the counterweight will enter the opening 17 without interference, and will also tend to counterbalance the weight of the long end of the tape or the like 11. As the float 8 rides up and down with the rise and fall of the liquid, it will rotate the pulley 16 and the shaft 32 first in one direction and then in the other, depending upon the increase or decrease of the amount of liquid in the tank. The compartment containing the pulley 16, being completely shut off from the remainder of the mechanism and completely closed, will serve to eliminate the necessity for at any time opening the tank to the atmosphere except when making adjustments as will be described. The shaft 44 being connected to the shaft 32 by an insulating coupling, no part exposed to the interior of the tank will have any electrical connection with the remainder of the device. The rotation of the pulley 16 will cause rotation of both the brushes 45 and 53, but due to the connection through the gears 48, 49, 50 and 51 the brush 53 will only move a fraction of the distance moved by the brush 45. Preferably, the ratio is such that the brush 45 will move from one contact point to the next upon movement of one-eighth of an inch upwardly or downwardly by the float 8, whereas the brush 53 will move from one contact point to the next upon movement upwardly or downwardly a distance of one-half foot by the float 8. The resistance of each rheostat is measured separately by means of the double throw switch 109, and the readings of the variable resistances 114 will be taken as feet and inches of elevation of the float 8.

In making adjustments, the telephone sets or other signalling apparatus may be connected as indicated, and with one operator stationed at the tank and another at the central station, a reading will be taken at the central station and a sounding taken at the tank. If these two do not agree the operator at the tank will then remove the cover from the housing 27, loosen the wing nuts 55, and adjust the coupling until the resistance indicated on the instrument at the central station corresponds to the reading taken by the sounding device at the tank. The wing nuts 55 may then be tightened and the device is adjusted and will remain so adjusted until disturbed. The housing 27 is so constructed that transformer oil or similar insulating liquid may be placed therein to submerge the rheostats and other moving parts, and prevent all possibility of any sparking or other trouble at the contacts. Such possibility is very remote in any event, if not altogether impossible, because of the fact that the voltage to be impressed across the rheostats in the course of conducting a measurement will be considerably less than one volt, and the current flowing will be almost infinitesimal.

For the purpose of balancing the resistances of the lines connecting the central station with the various units in the field, compensating resistance may be placed in the conducting lines as shown. These may be accurately computed so as to perfectly balance the resistances of the various conducting lines regardless of any variations in the length thereof due to the position of the various tanks.

It will be seen from the foregoing that means has been provided for carrying out all of the objects of this invention in an efficient and accurate manner, eliminating the dangers of inaccuracy as well as most of the danger to operators, which have been prevalent in preceding structures. It will be apparent also that the present device provides a means for definitely eliminating the fire hazard and for reducing materially the error caused by the time required to take soundings in a plurality of tanks in the previously employed manner.

Having described my invention, I claim:

1. A rheostat adapted to be used in a liquid level indicating apparatus comprising a base of insulating material, a plurality of spaced anchor plates in substantially parallel relation to said base and to each other, each plate having a plurality of spaced openings about its outer periphery and the openings in one plate being staggered with respect to the openings in the other, a plurality of anchor posts on said base and arranged in a circular row spaced outwardly from said plates, a resistance wire strung in turn about one of said anchor posts, through an adjacent opening in one of said anchor plates, about the next adjacent anchor post, through an adjacent opening in the other anchor plate, and so on, and a brush movable to bear on said anchor posts in turn.

2. A rheostat adapted to be used in a liquid level indicating apparatus comprising a base, an anchor plate means on said base having a plurality of spaced openings about its outer periphery, a plurality of anchor posts on said base arranged in a double circular row closely adjacent each other spaced outwardly from said plate means, a resistance wire strung in turn about a pair of adjacent anchor posts in said inner and outer rows in a figure eight form, through an adjacent opening in said anchor plate means, about the next pair of anchor posts, and so on, and a brush movable to bear on said pairs of anchor posts in turn.

3. A rheostat adapted to be used in a liquid level indicating apparatus comprising a base, an anchor plate means on said base having a plurality of spaced openings about its outer periphery, a plurality of anchor posts on said base arranged in a double circular row closely adjacent each other spaced outwardly from said plate means, a resistance wire strung in turn about a pair of adjacent anchor posts in said inner and outer rows in a figure eight form, through an adjacent opening in said anchor plate means, about the next pair of anchor posts, and so on, and a brush movable to bear on said pairs of anchor posts in turn, said wire being completely enclosed with a molded insulating material.

WILLIAM E. MacCREEDY.